United States Patent
Kerns et al.

(10) Patent No.: US 7,137,377 B2
(45) Date of Patent: Nov. 21, 2006

(54) INTAKE VALVE CLEANING METHOD FOR A DIRECT INJECTION ENGINE WITH COMPUTER CONTROLLED INTAKE VALVES

(75) Inventors: James Kerns, Trenton, MI (US); Michael J. Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/077,874

(22) Filed: Mar. 10, 2005

(65) Prior Publication Data

US 2006/0201472 A1    Sep. 14, 2006

(51) Int. Cl.
*F02M 43/00* (2006.01)
*F02M 25/00* (2006.01)

(52) U.S. Cl. .................. 123/198 A; 123/90.15
(58) Field of Classification Search ............ 123/198 A, 123/295–305, 90.15, 478
See application file for complete search history.

(56) References Cited

U.S. PATENT DOCUMENTS

| 6,178,944 B1 | 1/2001 | Kerns et al. |
| 2003/0051707 A1 | 3/2003 | Pilgram et al. |

FOREIGN PATENT DOCUMENTS

| JP | 2001289097 | 10/2001 |
| JP | 2004251155 | * 9/2004 |

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

A method for a vehicle traveling on the road having an engine with adjustable valve operation is described. The method includes performing a valve cleaning operation for reducing deposits on a valve of the engine; and at least during said operation, adjusting valve timing of at least a valve of the engine and a fuel injection amount to increase an amount of fuel pushed back from a cylinder past the valve with deposits and then re-inducted through the valve with deposits.

12 Claims, 3 Drawing Sheets

INTAKE VALVE CLEANING METHOD FOR A DIRECT INJECTION ENGINE WITH COMPUTER CONTROLLED INTAKE VALVES

FIELD

The present disclosure relates to direct injection spark ignition engine with computer controlled intake valves.

BACKGROUND and SUMMARY

In direct spark ignition engines, fuel is injected directly into each combustion chamber. Accordingly, less fuel may be inducted past the intake valves than in port injected engines. Inducting fuel past the valves cleans carbon deposits which may deposit on the valves due to positive crankcase ventilation (PCV) and/or exhaust gas recirculation (EGR). Thus, reducing the amount of fuel inducted past the valves can result in increased deposits.

One approach to clean such deposits, using conventional cam timing and a throttle is described in U.S. Pat. No. 6,178,944. This approach injected fuel during a valve overlap period when the engine is throttled to draw fuel back into the intake port.

However, the inventors herein have recognized a disadvantage with such an approach. For example, this approach requires throttling which can increase pumping losses and increase fuel consumption. The additional fuel injected during vavle overlap also may increase fuel consumption since an additional injection of fuel is used. Further, in some engines, throttled conditions may be performed for an insufficient amount of the available operating range so that the opportunity to perform valve cleaning may be limited.

At least some of the above disadvantages may be overcome by a method for a vehicle traveling on the road having an engine with adjustable valve operation, the method comprising: performing a valve cleaning operation for reducing deposits on a valve of the engine; and at least during said operation, adjusting valve timing of at least a valve of the engine and a fuel injection amount to increase an amount of fuel pushed back from a cylinder past the valve with deposits and then re-inducted through the valve with deposits.

In this way, valve cleaning can be performed without requiring throttling conditions (although cleaning may be performed during throttled conditions, if desired).

An advantage of the above aspect is that fuel injected during the valve adjustments can be used to clean carbon deposits accumulated on and around an intake valve.

DETAILED DESCRIPTION

Figure 1:
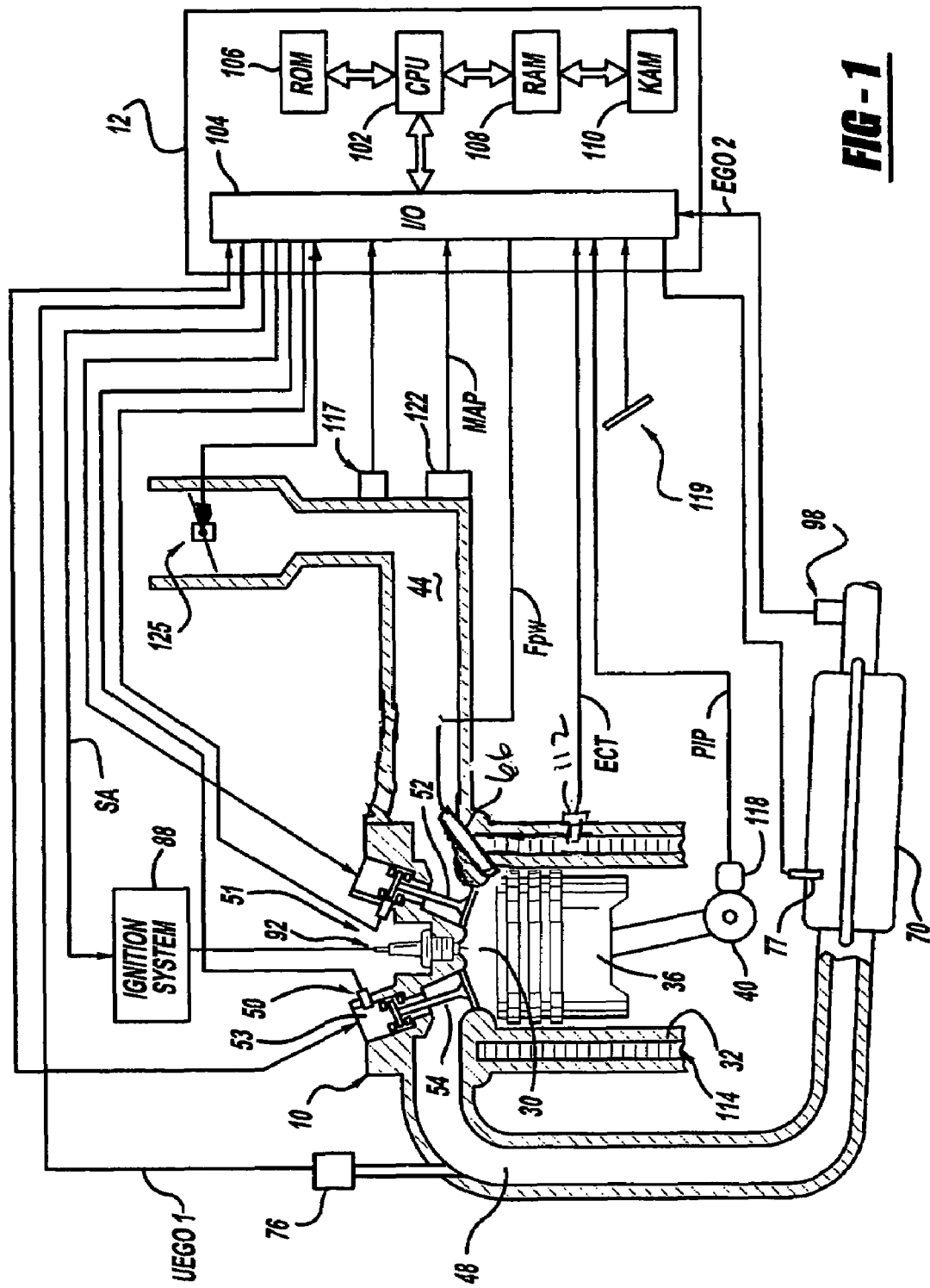
FIG. 1 is a block diagram of an embodiment in which the invention is used to advantage.

Referring to FIG. 1, direct injection internal combustion engine 10, comprising a plurality of cylinders, one cylinder of which is shown, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valves actuators for valves 52 and 54 has a position sensor and a temperature sensor. While this example shows both electrically actuated intake and exhaust valves, various combinations of electrically actuated and cam actuated valves may be used. For example, electrically actuated intake valves and mechanically actuated exhaust valves may be used. Further, the exhaust valves may have variable cam timing, and/or may be hydraulically or otherwise deactivated.

Combustion chamber 30 is also shown having fuel injector 66 coupled therein for delivering liquid fuel in proportion to the pulse width of signal FPW from controller 12. While FIG. 1 shows fuel injector 66 on the side of the combustion chamber, it may be positioned in various alternative locations. For example, fuel injector 66 may be positioned in the cylinder head similar to spark plug 92.

Fuel may be delivered to fuel injector 66 by fuel system (not shown) including a fuel tank, fuel pump, and fuel rail (not shown). A high pressure fuel system may be used, including a high pressure and low pressure pump. In addition, intake manifold 44 is shown communicating with optional electronic throttle plate 125 controlled by an electronic throttle controller (not shown). The controller may include an electric motor, gears, position sensors, and various circuitries, which may communicate with controller 12.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

As described in more detail below, with the ability to adjust valve timing, it may be possible to provide valve cleaning with less throttling. For example, if fuel is injected during an intake stroke, but the intake valve closing is delayed until some point in the compression stroke, some portion of the injected fuel and inducted air may be pushed back into the intake port where it can contact the back of the intake valve.

In other words, in one example embodiment, fuel is moved from inside the cylinder into the intake port where it can clean the back of an intake valve. This may be done by injecting fuel into the cylinder and then delaying the closing of the intake valve until after some of the fuel has been pushed back into the intake port. If fuel is injected during the intake stroke, and the intake valve closing is delayed, fuel (and air) may be pushed back into the intake port with or without the assistance of a lower manifold pressure caused by a throttle.

However, in this case, the amount of fuel injected may be adjusted to provide the appropriate amount of fuel for combustion. In one approach, for the first engine cycle, the fuel injected may be calculated as a function of the total mass of air inducted into the cylinder (including the air that is pushed back into the manifold). For subsequent engine cycles, the injected fuel may be adjusted to account for the fuel re-inducted from the intake manifold. Depending on the cylinder/injector/valve geometry, it may be desirable to inject the fuel late in the intake stroke, or even during the initial compression stroke (while the intake valve is still open) to maximize the quantity of fuel and the size of the fuel droplets pushed back into the intake port. Further, in one embodiment, injection pressure may be adjusted. In this way, injection pressure may be reduced, thereby resulting in less atomization of the fuel which can increase the amount of liquid fuel that is pushed back into the intake, to further improve cleaning.

Figure 2A:
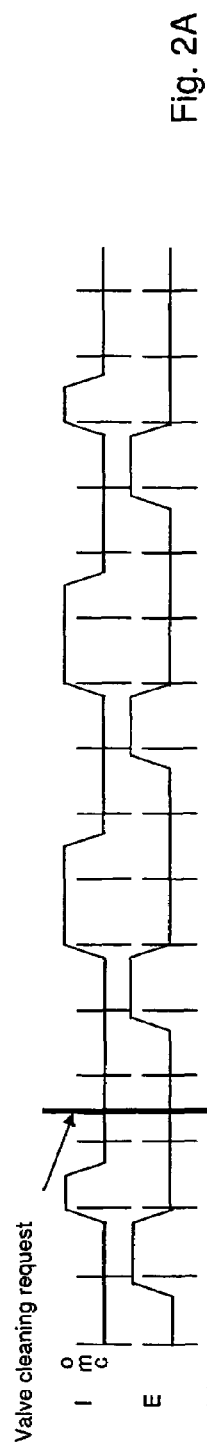
FIGS. 2A–C show various examples of variation in valve timing and injection timing.
Figure 2B:
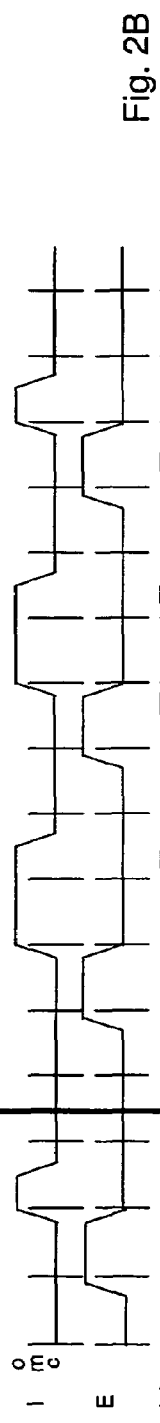
Figure 2C:
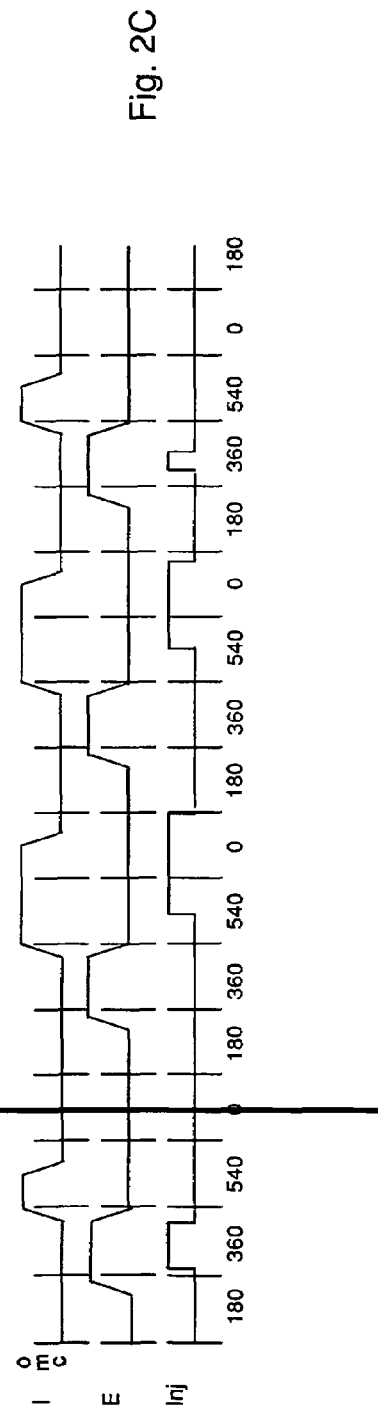

Referring now to FIGS. 2A–C, various examples of valve timing adjustment and fuel timing adjustment are for a cylinder, with the x-axis representing crank angle degrees, where 0 represents bottom dead center (BDC) of an intake stroke. These figures describe example processes for removing valve deposits accumulated on and around intake valve 54a and other intake valves not shown in FIG. 1. Those skilled in the art will recognize that the processes described herein may be used to advantage with one-valve, two-valve, three-valve, four-valve, and any other number of intake valve combinations. Also, some examples provide the advantage of cleaning valve deposits on the intake port adjacent to the intake valve.

Returning now specifically to FIG. 2A, it shows an example where late intake valve closing timing is used in combination with adjusting the amount of injected fuel (as well as injection timing) to generate valve cleaning operation in response to a request for such operation. After two cycles of increase fuel injection and adjusted intake valve timing, further adjustments are performed to return to non-cleaning operation. FIG. 2B shows another embodiment where multiple fuel injections are used during valve cleaning operation to adjust the timing when fuel is injected relative to valve events and piston position. FIG. 2C shows still another embodiment where delaying injection timing is utilized.

While FIGS. 2A–C show various example, any combination of these features, or other adjustments, may be used, as described herein. Also, various adjustments may be made to valve timing, including adjusting intake valve opening timing early and/or later, adjusting intake valve closing timing early and/or later, adjusting exhaust valve opening timing early and/or later, adjusting exhaust valve closing timing early and/or later, and/or combinations thereof.

It should also be noted that while FIGS. 2A–C show operation of a single cylinder, the valve and fuel adjustments may be performed in each cylinder of the engine simultaneously during valve cleaning. Alternatively, a valve cleaning mode can be performed for some cylinders (or a single cylinder), while remaining cylinders carry out unmodified valve timing and fuel injection. Further, valve cleaning operation can be sequentially performed for each cylinder separately, if desired. In this way, any transients created by valve cleaning can be reduced.

Figure 3:
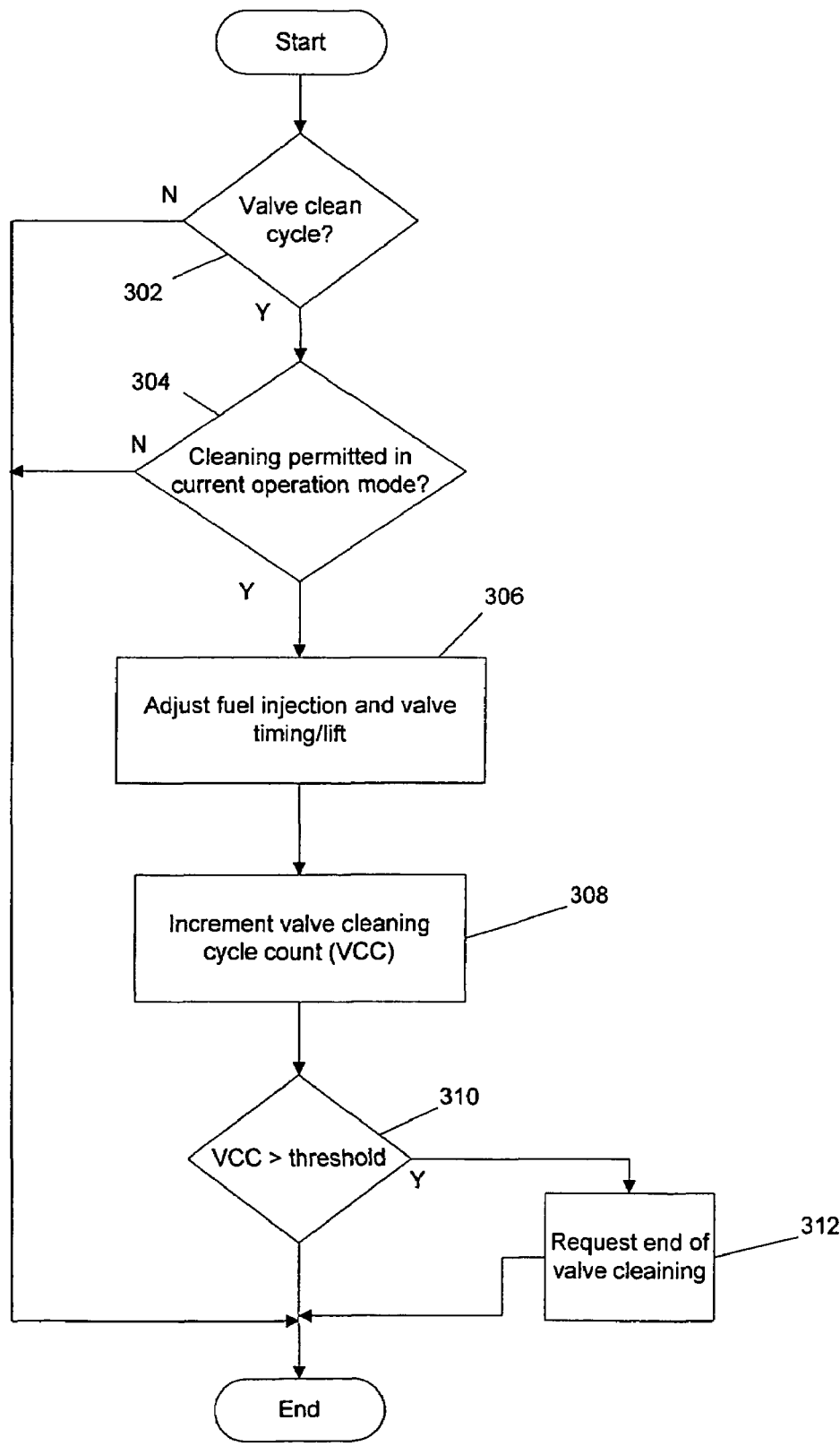
FIG. 3 shows a high level flow chart which depicts a portion of the operation of the embodiment shown in FIG. 1.

Referring now to FIG. 3, a high level flow chart is shown describing a method for cleaning carbon and/or other deposits accumulated on the intake valves and/or intake ports. During step 202, an indication is provided that a valve cleaning cycle is requested. This indication may be provided by counting a predetermined number of elapsed engine cycles or by accumulating fuel delivered to the engine, and when such accumulation reaches a predetermined value, providing a valve cleaning indication. This routine then proceeds to step 304 to determine the operating mode. If the mode includes a mode in which cleaning is permitted (e.g., a homogeneous air/fuel combustion mode, or a homogenous compression ignition mode, etc.), then the routine proceeds to step 306. Otherwise, the routine proceeds to the end.

Proceeding with the flow chart shown in FIG. 3, in step 306, additional fuel may be injected and valve timing and/or lift of the intake and/or exhaust valve may be adjusted to increase the pushback of air/fuel into the intake manifold intake valve 52a. The additional fuel is thereby drawn from combustion chamber 30, past intake valve 52a, into intake manifold 58. Subsequently, during later intake strokes, the additional fuel is drawn back from intake manifold 58, past intake valve 52a and the surrounding intake port to clean carbon deposits accumulated on and around intake valve 52a.

As described above, initially additional fuel may be injected. However, during later cycles of the cleaning operation, injected fuel may be reduced in proportion to the additional fuel added previously to reduce an increase in torque or air/fuel excursion which might otherwise occur. The accumulated valve cleaning cycle time (VCC) is then incremented in step 308. Then, in step 310, if the count is above a threshold, a request to end valve cleaning operation is made in step 312. The routine then ends.

Thus, in one example, the routine can vary the amount of injected fuel depending on whether the valve cleaning operation is commencing, in progress, or concluding.

As will be appreciated by one of ordinary skill in the art, the specific routine described below in the flowchart may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, the Figure graphically represents code to be programmed into a computer readable storage medium, such as in controller 12.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for a vehicle traveling on a road having an engine with adjustable valve operation, the method comprising:

performing a valve cleaning operation for reducing deposits on a valve of the engine; and at least during said operation, adjusting valve timing of at least a valve of the engine and adjusting a fuel injection amount to increase an amount of fuel pushed back from a cylinder past the valve with deposits and then re-inducted through the valve with deposits, wherein said adjusting of said fuel amount includes initially increasing injected fuel when transitioning into valve cleaning operation and then decreasing infected fuel when transitioning out of valve cleaning operation.

2. The method of claim 1 wherein said valve with deposits is an intake valve, and said adjusted valve is said intake valve.

3. The method of claim 2 wherein adjusting timing includes adjusting intake valve closing time.

4. The method of claim 2 wherein said valve timing include adjusting intake valve opening time.

5. The method of claim 1 wherein adjusting timing includes adjusting exhaust valve closing time.

6. The method of claim 2 wherein said valve timing include adjusting exhaust valve opening time.

7. The method of claim 2 further comprising directly injecting fuel into the engine.

8. A system for a vehicle traveling on a road having an engine, comprising:

a cylinder having at least an intake valve and an exhaust valve, said intake valve being electrically actuated;

a fuel injector directly injecting fuel into said cylinder; and a controller for performing a valve cleaning operation for reducing deposits on said intake valve of the engine, said controller adjusting valve timing of at least said intake valve of the engine and adjusting a fuel injection amount to increase an amount of fuel pushed back from a cylinder past the intake valve and then re-inducted through the intake valve at least during said operation, wherein said controller adjusts said intake valve timing to delay intake valve closing at least during said valve cleaning operation, wherein said controller adjusts a fuel injection timing to delay an end of fuel injection at least during a portion of said valve cleaning operation, and where said controller adjusts said fuel amount by initially increasing injected fuel when transitioning into valve cleaning operation and then decreasing injected fuel when transitioning out of valve cleaning operation.

9. The system of claim 8 wherein said controller adjusts intake valve timing of an intake valve in each cylinder of the engine.

10. The system of claim 8 where said controller adjusts intake valve timing of an intake valve in less than all cylinders of the engine.

11. The system of claim 8 wherein an exhaust valve is cam actuated.

12. The system of claim 8 wherein an exhaust valve is electrically actuated.

* * * * *